US012769092B2

United States Patent
(12) United States Patent
Offersgaard

(10) Patent No.: US 12,769,092 B2
(45) Date of Patent: Oct. 20, 2026

(54) IMAGING SYSTEM

(71) Applicant: AAC Optics Solutions Pte. Ltd., Singapore City (SG)

(72) Inventor: Jesper Falden Offersgaard, Farum (DK)

(73) Assignee: AAC Optics Solutions Pte. Ltd., Singapore City (SG)

( * ) Notice: Subject to any disclaimer, the term of this patent is extended or adjusted under 35 U.S.C. 154(b) by 314 days.

(21) Appl. No.: 18/398,220

(22) Filed: Dec. 28, 2023

(65) Prior Publication Data

US 2024/0337819 A1 Oct. 10, 2024

Related U.S. Application Data

(63) Continuation of application No. PCT/CN2023/086336, filed on Apr. 4, 2023.

(51) Int. Cl.
*G02B 13/00* (2006.01)
*G02B 17/08* (2006.01)

(52) U.S. Cl.
CPC ..... *G02B 13/0065* (2013.01); *G02B 13/0045* (2013.01); *G02B 17/0892* (2013.01)

(58) Field of Classification Search
CPC ............ G02B 13/0065; G02B 13/0045; G02B 17/0892
See application file for complete search history.

(56) References Cited

U.S. PATENT DOCUMENTS 5,999,310 A * 12/1999 Shafer ................ G02B 17/0808 359/357

FOREIGN PATENT DOCUMENTS

WO WO-2019119108 A1 * 6/2019 ............ H02S 40/22

OTHER PUBLICATIONS

English translation of WO 2019119108 A1 (Year: 2019).*
English translation of CN 114185161 (Year: 2022).*

* cited by examiner

*Primary Examiner* — Lucy P Chien
(74) *Attorney, Agent, or Firm* — Wiersch Law Group

(57) ABSTRACT

Provided is an imaging system suitable for imaging in a broadband ultraviolet band and including a refractive-reflective lens group; a lens barrel lens group; and an optical path folding reflective assembly. The refractive-reflective lens group includes a refractive-reflective assembly, a field lens assembly and a focusing assembly, the refractive-reflective assembly focuses light onto the field lens assembly to correct chromatic aberration, then light passes the focusing assembly, the lens barrel lens group and the optical path folding reflective assembly and is then imaged on an image surface. A magnification of the imaging system is M that satisfies M=F1/F2, where F1 denotes a focal length of the refractive-reflective lens group, and F2 denotes a focal length of the lens barrel lens group. The imaging system is suitable for imaging in a broadband ultraviolet band.

13 Claims, 4 Drawing Sheets

IMAGING SYSTEM

CROSS-REFERENCE TO RELATED APPLICATIONS

This application is a continuation of International Application No. PCT/CN2023/086336, filed on Apr. 4, 2023, which is hereby incorporated by reference in its entirety.

TECHNICAL FIELD

The present disclosure relates to the field of microscope imaging, and in particular, to an imaging system particularly suitable for imaging in a broadband ultraviolet band.

BACKGROUND

Ultraviolet detection microscopes have great application values in fields of physics, chemistry, material science, life science and the like, especially in fields of semiconductor industry and photo-electronics industry. A deep ultraviolet detection microscope, which is a highly crucial detection equipment, can be used for detecting lithography patterns on a silicon wafer or a mask after exposure, development, etching and the like. The microscope can be used for rapidly observing an overall effect of the lithography pattern on the silicon wafer or the mask, and for measuring a line width (CD) of the lithography pattern and for detecting a defect.

Since there are few materials available for chromatic aberration correction in ultraviolet bands, it is difficult to design a high-performance microscope suitable for broadband ultraviolet band applications. Furthermore, it is more difficult to correct chromatic aberration in ultraviolet broadband optics using a wide range zoom.

In view of this, it needs to provide a new imaging system suitable for imaging in a broadband ultraviolet band.

SUMMARY

In view of the above problems, the present disclosure provides an imaging system suitable for imaging in a broadband ultraviolet band.

An embodiment of the present disclosure provides an imaging system suitable for imaging in a broadband ultraviolet band and including: a refractive-reflective lens group; a lens barrel lens group; and an optical path folding reflective assembly. The refractive-reflective lens group includes a refractive-reflective assembly, a field lens assembly and a focusing assembly, the refractive-reflective assembly focuses light from an object onto the field lens assembly to correct chromatic aberration, and the light after correcting the chromatic aberration sequentially passes the focusing assembly, the lens barrel lens group and the optical path folding reflective assembly and is then imaged on an image surface. A magnification of the imaging system is M that satisfies M=F1/F2, where F1 denotes a focal length of the refractive-reflective lens group, and F2 denotes a focal length of the lens barrel lens group, the lens barrel lens group has a zoom range without changing high-order chromatic aberration, and the optical path folding reflective assembly has an optical path distance variation range adapted to the zoom range of the lens barrel lens group.

As an improvement, the imaging system is applied to imaging of light within a wavelength range of 250 nm to 450 nm.

As an improvement, distortion of the imaging system is less than 0.1%.

As an improvement, a Strehl ratio of the imaging system is greater than 0.9.

As an improvement, the magnification of the imaging system is within a range from 50 to 250.

As an improvement, a magnification variation within a wavelength range of the imaging system is less than 0.1%.

As an improvement, the imaging system has a highest telecentricity of less than 1 mrad.

As an improvement, the refractive-reflective assembly includes a first lens having a first reflective coating at an image-side surface of the refractive-reflective assembly and a second lens having a second reflective coating at an object-side surface of the refractive-reflective assembly, the second lens has a window for receiving light from an object, an opening is provided at a center of the first lens, the light received by the window is refracted to the first reflective coating after sequentially passing the second lens and the first lens and is then reflected by the first reflective coating, the light reflected by the first reflective coating is refracted to the second reflective coating after sequentially passing the first lens and the second lens and is then reflected by the second reflective coating, and the light reflected by the first reflective coating is refracted by the second lens and is then focused onto the field lens assembly.

As an improvement, the field lens assembly is at least partially arranged within the opening.

As an improvement, the field lens assembly includes a plurality of lenses made of at least two refractive materials with different chromatic dispersions, and the plurality of lenses is sequentially arranged from an object side to an image side.

As an improvement, the at least two refractive materials with different chromatic dispersions include fused silica and calcium fluoride.

As an improvement, the plurality of lenses is divided into a third lens that is made of the calcium fluoride and a fourth lens and a fifth lens that are made of the fused silica.

As an improvement, the third lens is glued and fixed to an object side of the fourth lens, the fifth lens is arranged at an image side of the fourth lens and spaced from the fourth lens, and a gluing surface of the third lens and a gluing surface of the fourth lens have a same curvature radius.

As an improvement, the fifth lens is glued to an object side of the third lens, the fourth lens is glued to an image side of the third lens, a gluing surface of the third lens and a gluing surface of the fourth lens have a same curvature radius, and a gluing surface of the fifth lens and a gluing surface of the third lens have a same curvature radius.

The present disclosure has the following beneficial effects: the imaging system can be particularly suitable for imaging in a broadband ultraviolet band by structural design of the imaging system.

BRIEF DESCRIPTION OF DRAWINGS

In order to better describe the technical solutions in the embodiments of the present disclosure, the drawings required to be used in the description of the embodiments will be briefly described below, obviously, the drawings in the following description are only some embodiments of the present disclosure, and for those skilled in the art, other drawings may further be obtained in accordance with these drawings without any creative effort.

DESCRIPTION OF EMBODIMENTS

In order to better illustrate the objects, technical solutions and advantages of the present disclosure, various embodiments of the present disclosure will be described in detail below in connection with the accompanying drawings. However, those skilled in the art should understand that in various embodiments of the present disclosure, numerous technical details are set forth for the reader to better illustrate the present disclosure. However, even without these technical details and various variations and modifications based on the following embodiments, the technical solutions claimed in the present disclosure can be implemented.

The imaging system of the present disclosure is particularly suitable for ultraviolet imaging applications, such as an ultraviolet microscope objective, a collector for surface scattered ultraviolet light in a wafer inspection device, and a mask projection optical system of an ultraviolet lithography system.

Figure 1:
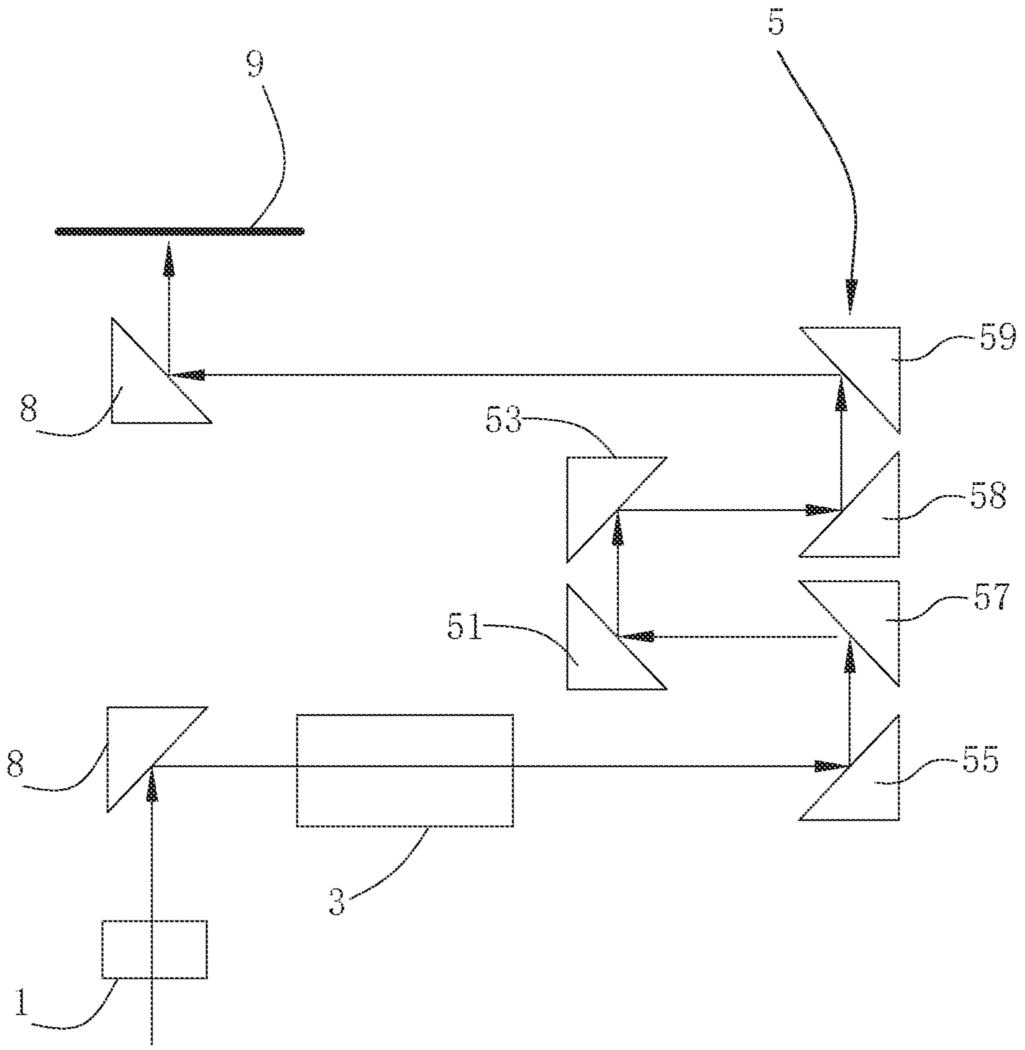
FIG. 1 is a schematic structural diagram of an imaging system according to the present disclosure.

Referring to FIG. 1, an imaging system provided by an embodiment of the present disclosure includes a refractive-reflective lens group 1, a lens barrel lens group 3 and a light path folding reflective assembly 5. Light from an object is imaged on an image surface 9 after passing the refractive-reflective lens group 1, the lens barrel lens group 3 and the light path folding reflective assembly 5 in sequence.

It should be noted that a direction of an arrow shown in FIG. 1 represents a direction of light from an object side to an image side.

As shown in FIG. 1, a reflective element 8 having a reflective surface is provided between the refractive-reflective lens group 1 and the lens barrel lens group 3, and also between the light path folding reflective assembly 5 and the image surface 9. Light from the refractive-reflective lens group 1 is reflected to the lens barrel lens group 3 via the reflective surface of the reflective element 8, and light from the light path folding reflective assembly 5 is reflected to the image surface 9 for imaging via the reflective surface of another reflective element 8.

The reflective element 8 may be a prism, for example, a triangular prism shown in FIG. 1, a plane mirror, or the like.

Figure 2:
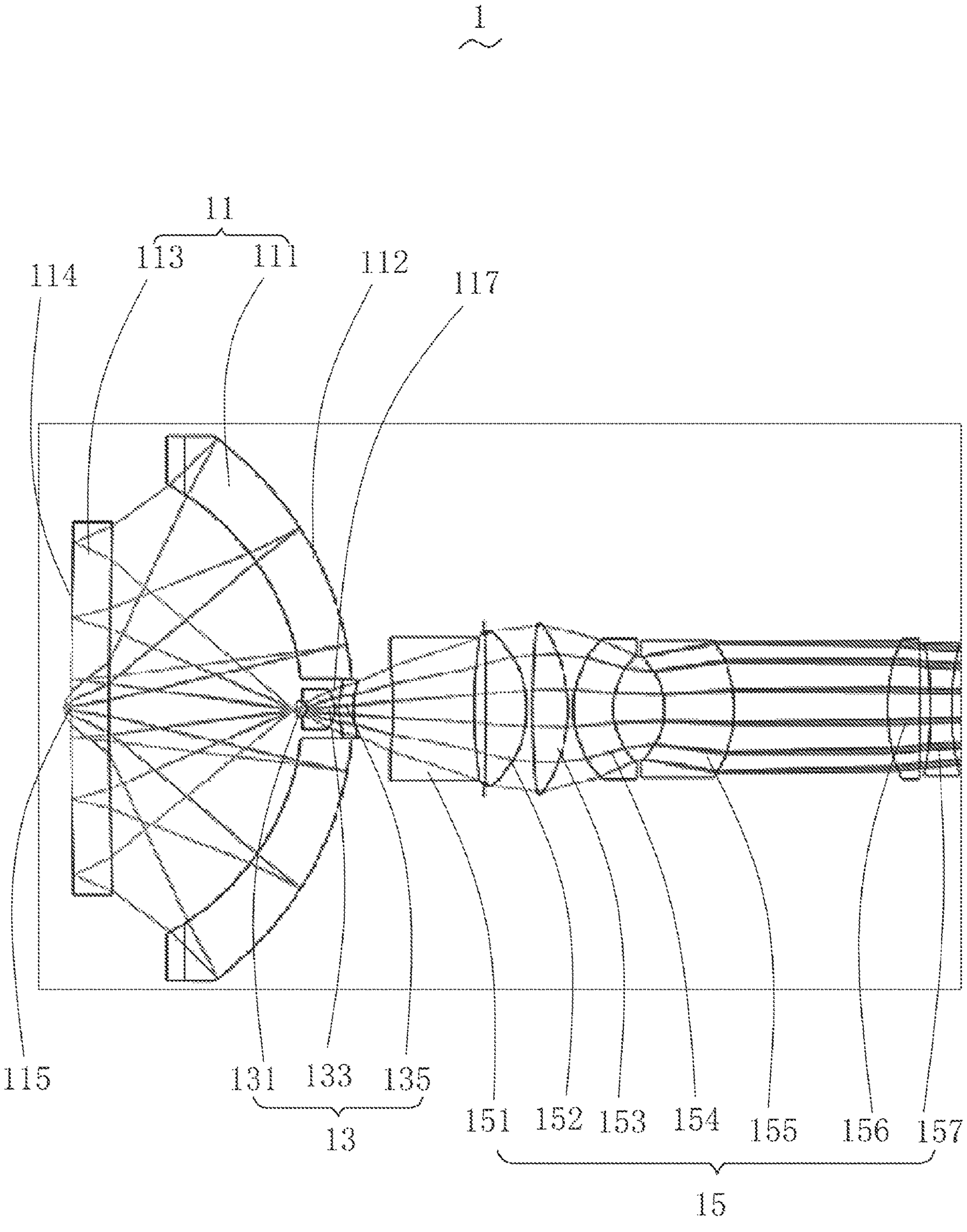
FIG. 2 is a schematic structural diagram of a refractive-reflective lens group in the imaging system shown in FIG. 1 to an embodiment of the present disclosure.

Referring to FIG. 2, the refractive-reflective lens group 1 includes a refractive-reflective assembly 11, a field lens assembly 13 and a focusing assembly 15. The refractive-reflective assembly 11 focuses light from an object onto the field lens assembly 13 to correct chromatic aberration, and the light after correcting the chromatic aberration sequentially passes the focusing assembly 15, the lens barrel lens group 3 and the light path folding reflective assembly 5 in sequence, and then is imaged on the image surface 9. A magnification of the imaging system is M that satisfies M=F1/F2, where F1 denotes a focal length of the refractive-reflective lens group 1, and F2 denotes a focal length of the lens barrel lens group 3. Herein, the lens barrel lens group 3 has a zoom range without changing high-order chromatic aberration, and the light path folding reflective assembly 5 has an optical path distance variation range adapted to the zoom range of the lens barrel lens group 3.

In an example, the focal length of the refractive-reflective lens group 1 is 23.35 mm, and a total optical length of the refractive-reflective lens group 1 is 345 mm.

The refractive-reflective assembly 11 includes a first lens 111 having a first reflective coating 112 at an image-side surface thereof and a second lens 113 having a second in reflective coating 114 at an object-side surface thereof. The second lens 113 has a window 115 for receiving light from an object, and an opening 117 is provided at a center of the first lens 111. The light received by the window 115 is refracted to the first reflective coating 112 after sequentially passing the second lens 113 and the first lens 111, and is then reflected by the first reflective coating 112. Then, the light reflected by the first reflective coating 112 is refracted to the second reflective coating 114 after sequentially passing the first lens 111 and the second lens 113, and is then reflected by the second reflective coating 114. The light reflected by the first reflective coating 112 is refracted by the second lens 113 and then focused on the field lens assembly 13.

It should be noted that an optical aperture of the window 115 does not need not be defined by the opening 117 and can be simply be defined by the second reflective coating 114. In an example, the window 115 is formed by exposing a region where an object-side surface of a transparent lens is not coated with the second reflective coating 114.

It should also be noted that the first reflective coating 112 and the second reflective coating 114 may be a magnesium fluoride coating or an aluminum coating. In an example, the first reflective coating 112 and the second reflective coating 114 may be polarization protected to enhance the reflectivity.

In an embodiment, a diameter of the window 115 is 1 mm, a diameter of the opening 117 is 48 mm, and an outlet angle range is ±21 mrad.

The field lens assembly 13 is at least partially located within the opening 117. This allows an aperture of the opening 117 to be small enough to facilitate focusing of more light onto the field lens assembly 13.

The field lens assembly 13 includes a plurality of lenses formed of at least two refractive materials having different chromatic dispersions, and the plurality of lenses is sequentially arranged from an object side to an image side.

In this embodiment, the refractive materials having different chromatic dispersions include fused silica and calcium fluoride.

Figure 3:
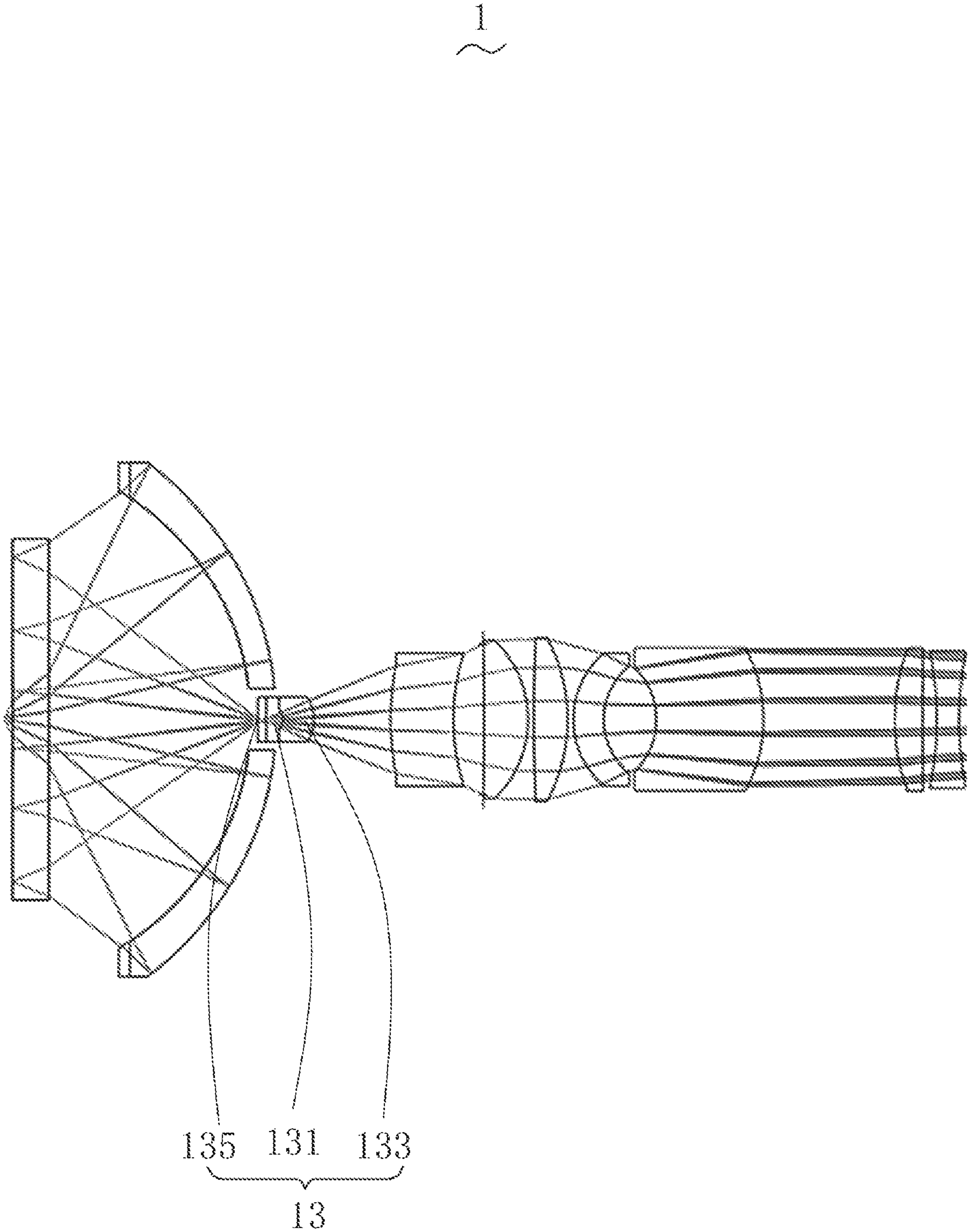
FIG. 3 is a schematic structural diagram of a refractive-reflective lens group in the imaging system shown in FIG. 1 to another embodiment of the present disclosure.

As shown in FIG. 2 and FIG. 3, the plurality of lenses is divided into a third lens 131 that is made of the calcium fluoride and a fourth lens 133 and a fifth lens 135 that are made of the fused silica.

As shown in FIG. 2, the third lens 131 is glued and fixed to an object side of the fourth lens 133, and the fifth lens 135 is disposed at an image side of the fourth lens 133 and is spaced from the fourth lens 133. A gluing surface of the third lens 131 and a gluing surface of the fourth lens 133 have a same curvature radius.

An object-side surface of the third lens 131 is a planar surface and an image-side surface of the third lens 131 is a convex surface; an object-side surface of the fourth lens 13 is a concave surface and an image-side surface of the fourth lens 13 is a convex surface; and an object-side surface of the fifth lens 135 is a convex surface and an image-side surface of the fifth lens 135 is a concave surface. It should be noted that the object-side surface and the image-side surface of the fifth lens 135 are both weak-curved surfaces.

Referring to FIG. 3, the fifth lens 135 is glued to an object side of the third lens 131, and the fourth lens 133 is glued to an image side of the third lens 131. A gluing surface of the third lens 131 and a gluing surface of the fourth lens 133 have a same curvature radius, and a gluing surface of the fifth lens 135 and a gluing surface of the third lens 131 have a same curvature radius.

An object-side surface and an image-side surface of the fifth lens 135 each are a planar surface; an object-side surface of the third lens 131 is a planar surface, and an image-side surface of the third lens 131 is a convex surface; and an object-side surface of the fourth lens 133 is a concave surface, and an image-side surface of the fourth lens 133 is a convex surface.

It should be noted that the field lens assembly 13 shown in FIG. 3 is more suitable for wave front correction than the field lens assembly 13 shown in FIG. 2.

As shown in FIG. 2 and FIG. 3, the focusing assembly 15 includes a plurality of lenses from an object side to an image side, and the plurality of lenses is lens a 151 (also referred to as a sixth lens), lens b 152 (also referred to as a seventh lens), lens c 153 (also referred to as an eighth lens), lens d 154 (also referred to as a ninth lens), lens e 155 (also referred to as a tenth lens), lens f 156 (also referred to as an eleventh lens), and lens g 157 (also referred to as a twelfth lens), respectively. An object-side surface of the lens a 151 is a concave surface and an image-side surface of the lens a 151 is a concave surface; an object-side surface of the lens b 152 is a planar surface and an image-side surface of the lens b 152 is a convex surface; an object-side surface of the lens c 153 is a convex surface and an image-side surface of the lens c 153 is a convex surface; an object-side surface of the lens d 154 is a convex surface and an image-side surface of the lens d 154 is a concave surface; an object-side surface of the lens e 155 is a concave surface and an image-side surface of the lens e 155 is a convex surface; an object-side surface of the lens f 156 is a convex surface and an image-side surface of the lens f 156 is a planar surface; and an object-side surface of the lens g 157 is a concave surface and an image-side surface of the lens g 157 is a concave surface.

The lens barrel lens group 3 includes a plurality of lenses from an object side to an image side, and a total focal length of the lens barrel lens group 3 can be adjusted by adjusting a distance between the lenses.

It should be noted that, in order to make the lens barrel lens group 3 zoom without changing the high-order chromatic aberration, the focal length of the lens barrel lens group 3 can be adjusted by adjusting the distance between at least two lenses, or by replacing the entire lens barrel lens group 3 with different distances between the at least two lenses.

Figure 4:
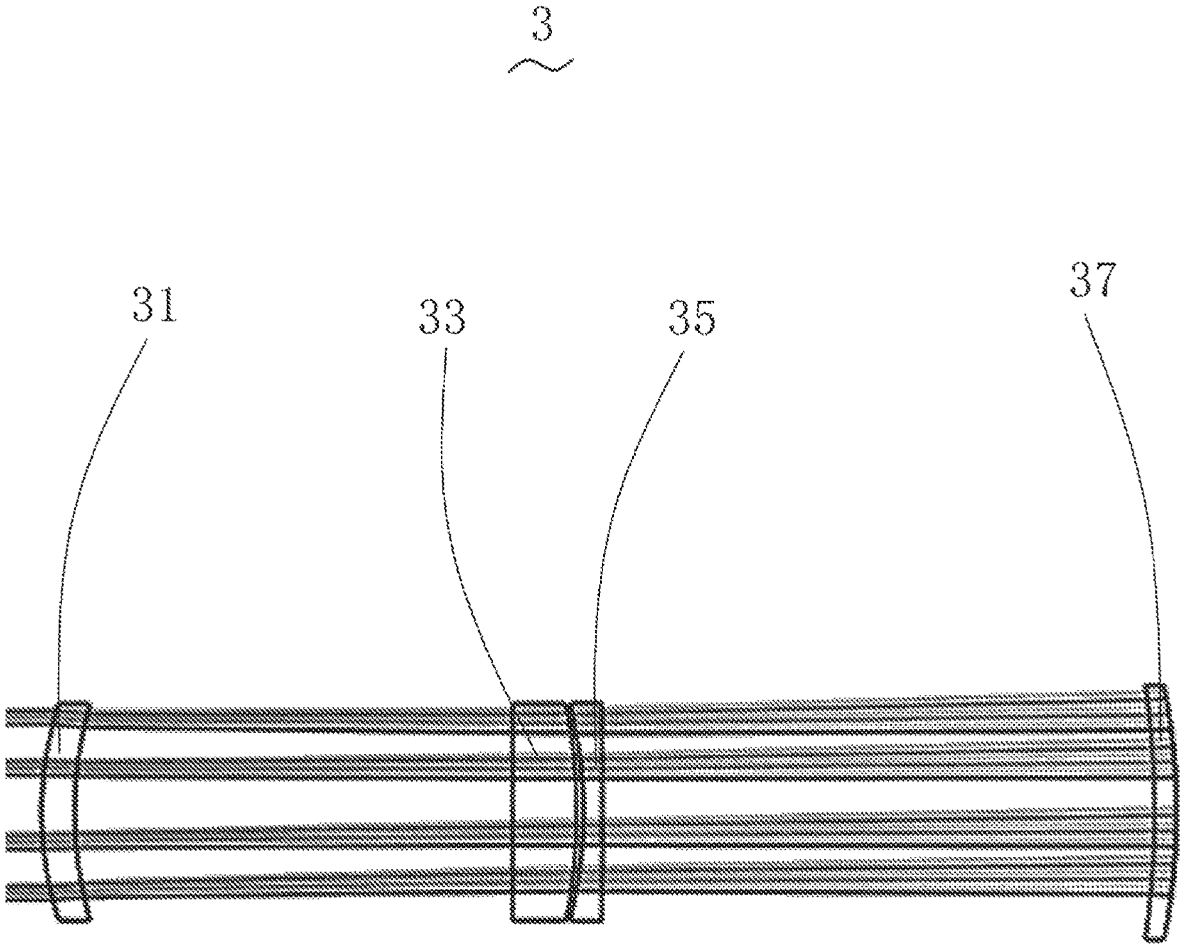
FIG. 4 is a schematic structural diagram of a lens barrel lens group in the imaging system shown in FIG. 1.

As shown in FIG. 4, a plurality of lenses includes a lens A 31 (also referred to as a thirteenth lens), a lens B 33 (also referred to as a fourteenth lens), a lens C 35 (also referred to as a fifteenth lens), and a lens D 37 (also referred to as a sixteenth lens), respectively. An object-side surface of the lens A 31 is a convex surface, and an image-side surface of the lens A 31 is a concave surface; an object-side surface of the lens B 33 is a planar surface, and an image-side surface of the lens B 33 is a convex surface; an object-side surface of the lens C 35 is a concave surface, and an image-side surface of the lens C 35 is a planar surface; and an object-side surface of the lens D 37 is a concave surface, and an image-side surface of the lens D 37 is a convex surface.

As shown in FIG. 1, the light path folding reflective assembly 5 includes a plurality of light reflective elements: a light reflective element A 51, a light reflective element B 53, a light reflective element C 55, a light reflective element D 57, a light reflective element E 58, and a light reflective element F 59, respectively. The light reflective element A 51 and the light reflective element B 53 form a first group of light reflective elements. The light reflective element C 55, the light reflective element D 57, the light reflective element E 58 and the light reflective element F 59 form a second group of light reflective elements, the first group of light reflective elements moving towards or away from the second group of light reflective elements can cause a change of the light path distance.

The light reflective element may be a prism, for example, a triangular prism shown in FIG. 1, a plane mirror, or the like.

The imaging system is applied to imaging of light within a wavelength range of 250 nm to 450 nm. It should be noted that an autofocus wavelength of the imaging system is 470 nm.

Distortion of the imaging system is less than 0.1%.

A Strehl ratio of the imaging system is greater than 0.9. It should be noted that a general trend of the imaging system is that a Strehl ratio of a lower wavelength is lower, except for an automatic wavelength. This is because a lower wavelength has a lower diffraction limit.

A magnification of the imaging system is 50 to 250. For example, when a focal length of the lens barrel lens group 3 is 1168 mm, a magnification of the imaging system is 50; and when a focal length of the lens barrel lens group 3 is 5838 mm, a magnification of the imaging system is 250.

A magnification variation within a wavelength range of the imaging system is less than 0.1%.

The imaging system has a highest telecentricity of less than 1 mrad.

Those skilled in the art can understand that the above embodiments are specific embodiments for implementing the present disclosure, and in practical applications, various changes may be made in form and detail without departing from a scope of the present disclosure.

What is claimed is:

1. An imaging system, suitable for imaging in a broadband ultraviolet band and comprising:

a refractive-reflective lens group;

a lens barrel lens group; and an optical path folding reflective assembly;

wherein the refractive-reflective lens group comprises a refractive-reflective assembly, a field lens assembly and a focusing assembly, the refractive-reflective assembly focuses light from an object onto the field lens assembly to correct chromatic aberration, and the light after correcting the chromatic aberration sequentially passes the focusing assembly, the lens barrel lens group and the optical path folding reflective assembly and is then imaged on an image surface; and wherein a magnification of the imaging system is M that satisfies $M=F1/F2$, where F1 denotes a focal length of the refractive-reflective lens group, and F2 denotes a focal length of the lens barrel lens group, the lens barrel lens group has a zoom range without changing high-order chromatic aberration, and the optical path folding reflective assembly has an optical path distance variation range adapted to the zoom range of the lens barrel lens group;

wherein the field lens assembly comprises a plurality of lenses made of at least two refractive materials with different chromatic dispersions, and the plurality of lenses comprises a third lens, a fourth lens and a fifth lens arranged from an object side to an image side;

wherein the third lens is glued and fixed to an object side of the fourth lens, and the fifth lens is arranged at an image side of the fourth lens and spaced from the fourth lens;

wherein an object-side surface of the third lens is planar at a paraxial region and an image-side surface is convex at a paraxial region; an object-side surface of the fourth lens is concave at a paraxial region and an image-side surface is convex at a paraxial region; and an object-side surface of the fifth lens is convex at a paraxial region and an image-side surface is concave at a paraxial region.

2. The imaging system as described in claim 1, wherein the imaging system is applied to imaging of light within a wavelength range of 250 nm to 450 nm.

3. The imaging system as described in claim 1, wherein distortion of the imaging system is less than 0.1%.

4. The imaging system as described in claim 1, wherein a Strehl ratio of the imaging system is greater than 0.9.

5. The imaging system as described in claim 1, wherein the magnification of the imaging system is within a range from 50 to 250.

6. The imaging system as described in claim 5, wherein a magnification variation within a wavelength range of the imaging system is less than 0.1%.

7. The imaging system as described in claim 1, wherein the imaging system has a highest telecentricity of less than 1 mrad.

8. The imaging system as described in claim 1, wherein the refractive-reflective assembly comprises a first lens having a first reflective coating at an image-side surface of the refractive-reflective assembly and a second lens having a second reflective coating at an object-side surface of the refractive-reflective assembly, the second lens has a window for receiving light from an object, an opening is provided at a center of the first lens, the light received by the window is refracted to the first reflective coating after sequentially passing the second lens and the first lens and is then reflected by the first reflective coating, the light reflected by the first reflective coating is refracted to the second reflective coating after sequentially passing the first lens and the second lens and is then reflected by the second reflective coating, and the light reflected by the first reflective coating is refracted by the second lens and is then focused onto the field lens assembly.

9. The imaging system as described in claim 8, wherein the field lens assembly is at least partially arranged within the opening.

10. The imaging system as described in claim 1, wherein the at least two refractive materials with different chromatic dispersions comprise fused silica and calcium fluoride.

11. The imaging system as described in claim 10, wherein the third lens is made of calcium fluoride, and the fourth lens and the fifth lens are made of fused silica.

12. The imaging system as described in claim 1, wherein the focusing assembly comprises a sixth lens, a seventh lens, an eighth lens, a ninth lens, a tenth lens, an eleventh lens, and a twelfth lens arranged in order from the object side to the image side;

wherein the sixth lens has a concave object-side surface and a concave image-side surface;

the seventh lens has a planar object-side surface and a convex image-side surface; the eighth lens has a convex object-side surface and a convex image-side surface; the ninth lens has a convex object-side surface and a concave image-side surface; the tenth lens has a concave object-side surface and a convex image-side surface; the eleventh lens has a convex object-side surface and a planar image-side surface; and the twelfth lens has a concave object-side surface and a concave image-side surface.

13. The imaging system as described in claim 1, wherein the lens barrel lens group comprises a thirteenth lens, a fourteenth lens, a fifteenth lens, and a sixteenth lens arranged in order from the object side to the image side;

wherein the thirteenth lens has a convex object-side surface and a concave image-side surface;

the fourteenth lens has a planar object-side surface and a convex image-side surface; the fifteenth lens has a concave object-side surface and a planar image-side surface; the sixteenth lens has a concave object-side surface and a convex image-side surface.

* * * * *